United States Patent [19]

Oberg

[11] 3,809,863

[45] May 7, 1974

[54] ARTICLE CODING SYSTEM

[75] Inventor: Anders B. Oberg, Jakobsberg, Sweden

[73] Assignee: Svenska Dataregister AB, Solna, Sweden

[22] Filed: Oct. 22, 1965

[21] Appl. No.: 500,814

[30] Foreign Application Priority Data

June 14, 1965 Sweden .............................. 7790/65

[52] U.S. Cl. ..................235/61.11 E, 235/61.12 R, 235/61.12 M, 235/61.12 N

[51] Int. Cl. ........................ G06k 7/10, G06k 19/06

[58] Field of Search ......... 235/61.12, 61.11, 61.115, 235/61.111

[56] References Cited

UNITED STATES PATENTS

| | | | |
|---|---|---|---|
| 3,114,144 | 12/1963 | Woo | 235/61.115 |
| 3,235,855 | 2/1966 | Woo | 340/146.3 XX |
| 3,334,236 | 8/1967 | Bacon | 235/61.115 |
| 3,359,405 | 12/1967 | Sundblad | 235/61.115 |

*Primary Examiner*—Daryl W. Cook

*Attorney, Agent, or Firm*—Norman Friedman; Robert F. Rotella

[57] ABSTRACT

An article coding system is provided which includes, in its preferred embodiment, a light sensing pen used in conjunction with a record bearing media. The article coding is such that there are indicia thereon having first and second dimensions and first and second reflectivity. These indicia are combined such that the wider dimension indicia form signals of two types, indicating two binary states, and the narrow dimension indicia are combined with opposite polarity indicia of larger dimension to provide a third signal, when used in combination with a light sensing device, for timing purposes.

14 Claims, 7 Drawing Figures

INVENTOR
ANDERS B. OBERG
BY [signature]
ATTORNEY

INVENTOR
ANDERS B. OBERG
BY David Leslie
ATTORNEY

ARTICLE CODING SYSTEM

This invention relates to a method and apparatus for the coding of articles and more particularly to an article coding method and apparatus whereby information recorded upon an article may be read from said article, said coding providing the necessary self-clocking for such reading.

It is well known in the prior art that information may be read or sensed from a properly coded information bearing surface such as a record or price tag. In these devices of the prior art, it is necessary that an internal clock or other synchronizing source be provided in order that the information be properly entered from the sensing device to the utilization device. In such devices it is necessary to provide an accurately timed relationship between the movement of a sensing device with respect to said record and the internal clock for the information received be correct and meaningful. Such devices were easily operable in punch record card reading devices wherein the card was physically placed within a sensing device and the movement of the card through such sensing device was under the control of the device itself.

Greater difficulty was encountered in efforts to sense the contents of record cards or other articles bearing data which could not be controlled as to spacial and time relationships with respect to the sensing device. In an effort to better provide synchronization between such records or articles bearing coded information and the sensing device it was generally accepted practice to record a timing track on the record or other article bearing coded information in order that the proper time relationship be maintained between the information and the timing information. Such an arrangement provided the clock information track which bore a direct relationship to the information to be sensed and therefore removed the necessity for an internal clock with the inherent problems of synchronization. However the requirements for controlled movement of any sensing device with respect to the record or article bearing information became even more important than previously. It was necessary that the information sensing device tracking the information track and that tracking the clock track be maintained in proper alignment so that the correct relationship between the clock pulse and its associate information areas was maintained. Skewing or any other distortion of the clock track with respect to the information track would cause erroneous clocking information to be generated and cause the misreading or nonstorage of information contained on the surface of the record or article bearing information. To attempt to avoid this it was then attempted to record certain clock or synchronization pulses in the same track as the information was recorded whereby there would be an alternation of information and clock pulses. The result of this employment of the additional clock pulses one for every information pulse greatly decreased the ability of a given record area to store information. This arrangement did however remove the requirement for carefully controlled movement of the sensing device and of the record and to a great extent eliminated problems inherent with the skewing of the sensing head with respect to the record.

In order to overcome the deficiencies noted above with respect to the prior art the present invention as broadly stated employs a unique coding arrangement whereby it is possible to produce a clock or timing information without the necessity for additional recorded information other than that which is required to produce the data information. This coding arrangement is accomplished by means of a set of indicia, each indicia bearing one characteristic from each of two characteristic groups, each group containing two characteristics. In this manner a ternary numbering code is provided for wherein one of the ternary values is the binary value of 1, a second is the binary value of 0, and the third provides the necessary clocking or timing information. The first of the two characteristic groups noted above is termed an indicia state and is represented in various embodiments as for example differences in reflectivity of the material, differences in the opacity of the material, (that is, the ability of it to transmit light), differences in the magnetic polarity of recorded information, differences in the conductivity of indicia areas and finally differences between magnetic recording and nonmagnetic recorded areas. In each of these indicia states, as noted above, a set of antagonistic conditions are setup, thus in the first instance where reflectivity is established there will be two possible characteristics, one of low reflectivity and the second of high reflectivity. The same will follow for each of the other groups noted.

With respect to the second group of characteristics, as noted above, they are termed an indicia dimension and will refer to size, that is, the indicia may have a first size or a second size. For example, with respect to a system employing opacity characteristics size may be controlled by means of a set of punches. Thus a punch aperture will produce a first opacity and a nonpunched area would produce a second opacity. The degree of light being permitted to pass through the punch or that which would be prevented from passing through the record by the nonpunch area would be dependent upon the size of the punch itself.

In the first embodiment of this invention the indicia state is represented by either low reflectivity or high reflectivity while the indicia dimension may be wide or narrow. A transducer will be provided to read the light reflected from the surface of the record, the amount of light reflected being dependent upon the reflective characteristic and the size of the indicia. Thus if the material shows low reflectivity and there is a great width the transducer, which may be a photoresponsive device will produce a first level of output. In the case where the indicia shows high reflectivity and is also of a great width a great deal of light will be reflected back to the photo-responsive member causing a different level signal to be produced. Finally in the cases wherein the indicia is either highly reflective or has low reflectivity and in which the indicia dimension is smaller than the width of the photo-responsive device an intermediary level signal is produced, such value being termed a clock signal as will be described in greater detail below.

In a second embodiment of the coding invention the indicia state is made to relate to opacity characteristics of the record. Thus a punch aperture will represent a first opacity and a nonpunched area will represent a second opacity. The coded record is passed between a photo-responsive member and a source of illumination such that light will be admitted to the photo-responsive member from the source in dependence upon the size and presence or absence of punched apertures. The output levels of the photo-responsive member can then be arranged to provide the desired three levels as noted above.

In a further embodiment a magnetic record may be employed and indicia placed upon said record by means of magnetic recording, wherein a first polarity magnetic recording and a second polarity magnetic recording may be used to establish the indicia states as noted above. In addition the width or length of the magnetically recorded area will be used to provide the indicia dimension as noted above. A magnetic transducer will be moved with respect to the record to produce the desired output signals.

Another alternative arrangement may be one in which areas of magnetized material and nonmagnetized material of either of two sizes may be alternated in patterns to produce the necessary indicia states and indicia dimensions as noted above.

A further arrangement employs materials having high conductivity and low conductivity as the indicia state criteria and the widths of such areas employed as the indicia dimension criteria. The record will be sensed by a suitable testing device and the desired signal levels produced.

Briefly stated the coding arrangement is such that by the use of an indicia state, for example, in the preferred embodiment the use of materials of different reflectivity and the use of a second characteristic, such as the indicia dimension, that is an area of wide or narrow dimension, it is possible to construct a numerical coding system having a ternary code, that is, providing three discrete states. A first to be described as a binary 0, a second to be described as a binary 1, and a third to provide the clocking pulses to provide distinctions between respective pulse intervals.

It is therefore an object of this invention to provide an improved form of coding system.

It is a further object of this invention to provide an improved ternary coding system.

It is still another object of this invention to provide a coding system for recording information upon a record which provides all necessary information and clock signals as well.

It is another object of this invention to provide a coding system, which provides both information and clocking signals.

It is still another object of this invention to provide a coding technique wherein a record may be coded to provide information and clock pulses such that no external clock, timing or synchronization system is necessary.

It is still another object of this invention to provide a coding system wherein information and clock signals may be provided and which may be adapted for use with a plurality of recording techniques.

It is still another object of this invention to provide a coding system wherein information may be recorded employing characteristics from two characteristic groups of two characteristics each, wherein a first characteristic group may describe an indicia state and the second characteristic group describe an indicia dimension.

It is yet another object of the invention to provide a coding system wherein a record may be coded by employing indicia of discrete reflectivity and discrete dimensions.

It is still anther object of this invention to provide a coding system wherein the indicia may have discrete degrees of opacity and discrete dimensions.

It is still another object of this invention to provide a coding system wherein the indicia may possess either of two magnetic polarities and discrete recording dimensions.

It is still another object of this invention to provide a coding system wherein indicia may be provided with discrete widths of different conductivity areas.

Other objects and features of the invention will be pointed out in the following description and claims and illustrated in the accompanying drawings, which disclose, by way of example, the principle of the invention, and the best modes which have been contemplated for carrying it out.

Figure 2:
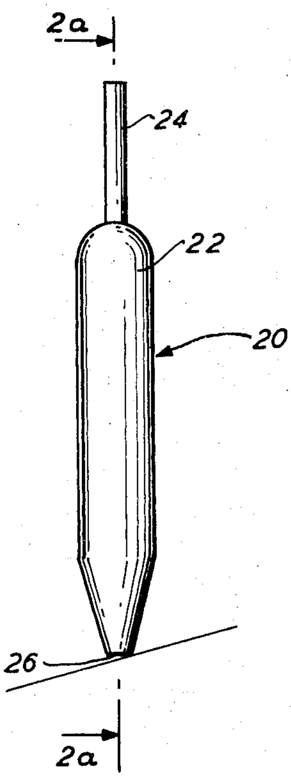
FIG. 2 is a side elevation of a photo-responsive probe employed for reading the information appearing upon a record coded according to FIG. 1.
Figure 2A:
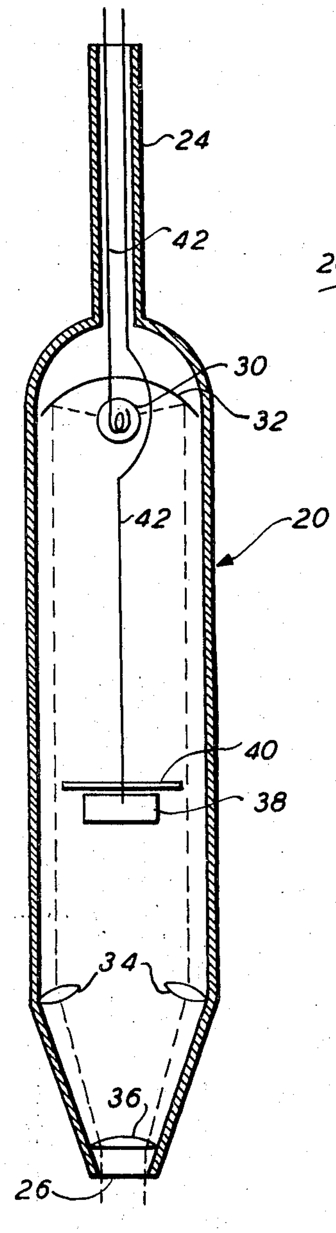

FIG. 2*a* is a section of the probe of FIG. 2 taken along the line 2*a*—2*a*.

Figure 1:
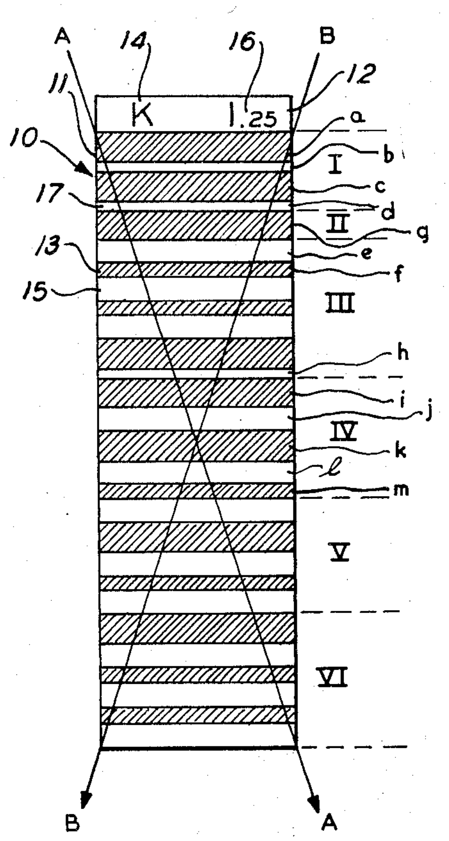
FIG. 1 is a plan view of an article bearing indicia formed in accordance with the concepts of this invention and showing the preferred embodiment wherein material of distinct reflectivity and dimension is employed.
Figure 3:
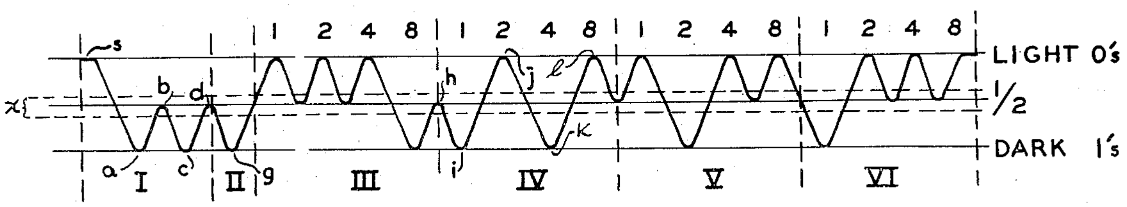

FIG. 3 is a diagram showing the readout signals available from the probe of FIGS. 2 and 2*a* when reading a record coded according to FIG. 1.

Figure 4:
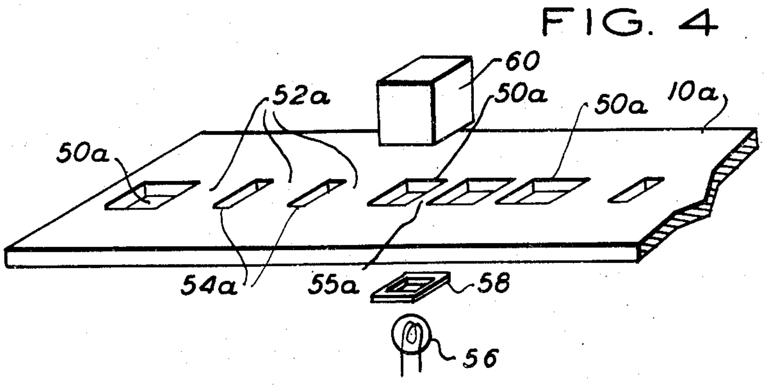

FIG. 4 shows a record coded according to a further embodiment of the invention wherein indicia of distinct opacity and dimensions are employed together with a device for sensing such indicia.

Figure 5:
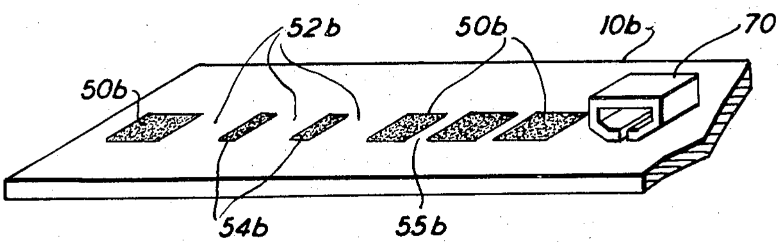

FIG. 5 shows a record coded according to a further embodiment of the invention wherein indicia of distinct magnetic polarity and dimensions are employed together with a device for sensing such indicia.

Figure 6:
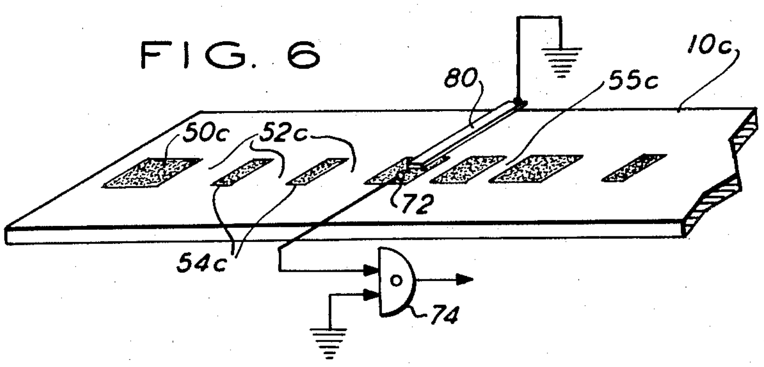

FIG. 6 shows a record coded according to a further embodiment of the invention wherein indicia of distinct conductivity characteristics and dimensions are employed together with a device for sensing such indicia.

Similar elements will be given similar reference characters in each of the respective Figures.

Turning now to FIG. 1, there is shown a record or article 10 coded in accordance with the preferred embodiment of this invention. This record 10 consists of indicia bands 11, 13, 15 and 17 of different reflectivity and which are of different dimensions. As illustrated in the Figure some of the indicia bands 11 and 13 are shown in crosshatch representing a first reflectivity whereas other indicia bands 15 and 17 are in white representing a second reflectivity. It should be understood that any colors or materials giving different reflective characteristics such that one may be readily distinguished from the other may be employed. It should be noted that the indicia bands are of two dimensions, that is, along the length of the record itself, these bands may be relatively wide bands 11 and 15 or narrow bands 13 and 17. The width of the narrow bands 13 and 17 with respect to the wide bands 11 and 15 is such that the narrow bands 13 and 17 are approximately 40 percent of the width of the wide bands 11 and 15.

Turning more specifically to FIG. 1, there is shown an article 10 coded according to the invention. There is a first zone 12 containing certain printed information which is readable by the operator and which may be employed to indicate the proper direction for feeding the record 10. It should be understood that either the record 10 may be moved with respect to a stationary light responsive probe or that the light responsive probe may be moved relative to the record 10 which is stationary. The zone 12 may contain certain information 14 such as the article class designated K, and the price information 16 coded on the remainder of the record 10 and shown in FIG. 1 as 1.25 means $1.25. Following the zone 12 there are a further set of zones I, II, III, IV, V and VI, which contain information indicating the direction of movement of the record, a checking bit and price. The zone I will be employed for information regarding movement whereas the zone II will be employed for parity checking purposes, the zone III will be employed for the department or article class, and finally the zones IV and V and VI will be reserved for the unit, tens and hundreds values of the price information.

Referring more particularly to zone I it is seen that the zone contains two wide crosshatched bands and two narrow white bands. The first band, designated *a* is a wide crosshatched band and is in turn followed by band "b" (a narrow white band), by band *c* (*a* wide crosshatched band), and finally by band *d* (*a* narrow white band). For the sake of clarity the crosshatched bands will be referred to as black bands although, as stated above, a number of colors or materials could be used. As will be more evident from the discussion with respect to FIG. 3 the wide black bands such as bands *a* and *c* will produce signals of a first level which will be considered the binary 1 value while the wide light area as shown by band *e* of zone III will be shown to produce a second output level considered to be the binary 0 value. The narrow light band, as shown at *b* of zone I or the narrow black band as shown in *f* of zone III will be shown to produce an intemediary output level which is considered the clock signal.

Turning now to FIG. 2 there is shown a probe 20 having a long cylindrical body 22, a wire stress reliever 24 and an orifice 26 in a tapered portion of the body 22. The orifice 26 permits light produced within the probe 20 to illuminate the surface of the record and admits the light reflected from the record to strike the photocell also within the probe 20. The diameter of the orifice 26 is arranged to be slightly less than the width of the wide white or black bands, that is, band *a* of zone I, or band *e* of zone III of FIG. 1. Due to the relative dimensions of the wide bands such as *a* of zone I, and *e* of zone III with respect to the narrow bands such as *b* of zone I, and *f* of zone III, the narrow bands will only succeed in illuminating or blocking half of the photocell within the probe 20. Thus when the probe 20 is placed over one of these narrow bands the photocell will concurrently read the band then under it and portions of the bands adjacent thereto. The reason for such joint reading will be apparent from the description to follow with respect to FIG. 3.

Turning now to FIG. 2a the internal arrangement of the components within the probe 20 of FIG. 2 is shown. Firstly, there is a lamp 30 whose light rays are caused to reflect from a reflector 32 and then pass through lenses 34 and 36 to leave the orifice 26 in a relatively parallel manner thus illuminating slightly less than the entire width of a wide white or black band or illuminating an entire narrow band together with portions of its adjacent bands. Light reflected from the surface of the record is passed through the lens 36 to strike a photocell 38. Light is not permitted to impinge directly upon the photocell 38 from the light source 30 due to the baffle 40 placed therebetween. The photocell 38 and the lamp 30 are connected by means of leads 42 which are coupled through the wire stress reliever 24 to the reading amplifiers or other equipment (not shown).

Referring now to FIGS. 1 and 3, the basic theory of operation may be understood. As the probe 20 is moved over the record 10, assumed to be stationary in this explanation, the first zone sensed by the probe 20 is the zone designated 12 which is white meaning it has a high reflectivity characteristic and contains the operator readable symbols 14 and 16. The highly reflectivity of the zone 12 causes a high level signal to be produced at the output of the photocell 38 (see FIG. 2*a*) within the probe 20. This signal is shown at the beginning of FIG. 3 by the high level peak at *s*. It should be recalled that a high level signal will be interpreted as a zero whereas a low level signal will be interpreted as a 1 and intermediary level signals will be interpreted as clock signals. The opposite signal designation may also be employed. Since the zone 12 is quite wide, wider than the orifice 26 of the probe 20 the entire photocell 38 will be exposed and will produce this high level signal. As the probe continues to move toward the band *a* of zone I, the probe moves to a black band of low reflectivity thus producing a low level signal shown by peak *a* of FIG. 3. This movement of the probe from the zone of high reflectivity 12 to the band *a* of low reflectivity is shown by the decreasing portion of the curve between peaks *s* and *a* of FIG. 3, the peak *a* occurring when the probe 20 is completely over the band *a*.

As the probe continues to move from band *a* of zone I toward band *b* of zone I the probe 20 goes from a band of low reflectivity to one of high reflectivity but of narrow width. Thus when the center of the orifice 26 is over the middle of band *b* of zone I the orifice 26 is also partially over bands a and *c* of zone I. As a result the light received by the photocell 38, within the probe 20, is at an intermediate level, that is a level which is about halfway - inside the halfway range x - between the maximum reflected light level reflected by a band of high reflectivity and the minimum reflected light level reflected by a band of low reflectivity. The output of the probe 20 is shown by the peak *b* in FIG. 3 and indicates the intermediate or clock level. This clock level will not contain information but will be used to separate successive pulses indicative of information of the same type. For example, it should be noted with respect to zone I that there are two wide black bands *a* and *c* whose outputs are of the same level. If not distinguished in some manner this would appear as a continuous output signal of the same low level. In order that the two signals be distinguished from one another it is necessary that clock pulses be provided for signal separation.

This may be done in prior art devices by providing either an external source of clocking signals or the use of intricate gating arrangements. The provision in the instant invention for the generation of clock pulses to separate and distinguish two or more successive signals of the same level eliminates this need entirely. Thus by the arrangement described herein, the coding restraints provide that there cannot be two successive indicia bands of the same kind, e.g., both black or both white, and that if it is necessary that two consecutive data bearing indicia bands be of the same type, then narrow clock generating indicia bands of opposite indicia state must be interposed therebetween. These narrow bands will provide the clock signals which will serve to distinguish consecutive signals of the same indicia state. It should be noted, as will be explained in detail below, that if consecutive indicia bands are different as to their indicia state but of the same indicia dimension, the resulting halfway level signal output will provide the required clock signal.

As the probe 20 continues to move toward zone VI it moves from the narrow reflective area *b* to the wide nonreflective or low reflective area *c* causing the output signal to change from the intermediate or clock value to the low level signal once more. This is shown by the peak *c* of FIG. 3. The probe 20 as it continues to move will then move over the narrow highly reflective area *d* and once more the output wave form will return to the intermediate or clock level at point *d*. As the probe 20 continues to move, it will move from the half exposed area (with the center of the probe 20 over the middle of band *d*) to the black or low reflective area as shown by the band *g* of zone II. Due to the low reflectivity of band *g* the level of light received by the photocell 38 of the probe 20 will be low and the output signal will again be at a low level. The output is shown at peak *g* in FIG. 3.

Turning now to the outputs of the probe 20 when reading the indicia bands of zone IV the output coding arrangement will be set forth. The price information coded on the tag as well as other required information is coded according to the wellknown 1, 2, 4, 8 binary decimal system. As the probe 20 moves from the narrow highly reflective or white band *h* to the wide low reflective or black band *i* the output signal level as shown between point *h* and *i* of FIG. 3 goes from the intermediate or clock level to the low level value at *i*. As the probe 20 continues to move, it moves over a wide highly reflective or white band *j* causing the output to produce a high level output signal as shown at the peak *j*. The probe 20 next moves to a wide low reflective or black band *k* and results in a production of a low level signal, shown by the peak *k* on the output waveform of FIG. 3. Next the probe 20 moves to the wide, highly reflective or white band *l* which produces a high level signal shown at the peak *l* of FIG. 3. Finally, as the probe 20 moves to the end of the zone IV a narrow low reflective or black band *m* is encountered and a clock level or intermediary signal is produced.

For every zone there will be four possible peak positions, which may be either high or low. In addition there will be as many intermediate or clock level peaks as are required to separate the successive peaks of the same level in each zone. From left to right the peak positions are arbitrarily assigned the values 1, 2, 4, 8. To read the information content of these zones, at every point that there is a peak at the low level, a 1 is considered to appear for the binary order assigned. It should be understood that any other assignment of values to the respective high and low peaks may be made without departing from the spirit of the invention. Thus there is a low level peak *i* for the binary order 1 and a low level peak *l* for the binary order 4 and thus the binary value of zone IV is 5.

A few other observations may be made with respect to the record of FIG. 1 now. The first thing which should be observed is that it is not possible to arrange bands upon the record 10 in such a manner that bands of the same reflectivity are adjacent one another. That is to say the reflectivity characteristic of an adjacent band must always be opposite. Secondly, there is no limitation upon the placement of wide bands of different reflective characteristics adjacent one another but it is not possible to place narrow bands of opposite reflective characteristics adjacent one another. The reason for this is as follows: The narrow bands are employed to produce the intermediate and clock signal level and there would be no value to producing two consecutive clock signal levels. The only time that narrow bands are necessary is when the information bands, that is the wide bands of either high or low reflectivity, repeat and it is necessary to delineate the end and start of adjacent bands of the same type. For example, in zones I and II, there appears a wide band *a* of a low reflectivity followed by a narrow highly reflective band *b*, a wide band of low reflectivity *c*, a narrow band of high reflectivity *d*, and a further wide band of low reflectivity *g*. If the two bands *b* and *d* of high reflective material were absent there would be no way of distinguishing the three low level signal peaks *a*, *c* and *g* of FIG. 3, produced by the three wide low reflective bands and the output signal would appear at a continuous output of the given low level starting with the first wide band *a* and ending with the wide black band *g*.

It should also be noted that where wide bands of different or opposite indicia states are adjacent one another there is no requirement for the use of additional narrow bands of either high or low reflectivity. This is due to the natural change from one level to the other in going from the wide band of high reflectivity to a wide band of low reflectivity or vice versa. Thus a further characteristic is obvious from this discussion, namely, that when adjacent bands are both wide but of opposite reflectivity there is no requirement for a narrow band therebetween because the natural requirement that there will be a change through the zero or intermediary level in going from one broad band characteristic to the other thereby producing a clock signal. Where there are consecutive signal producing bands of the same type it is necessary that a clock band of opposite type be interposed therebetween.

The pulse output from the photocell 38 may be fed into a translating device (not shown) or other device (not shown) to be converted to an output signal indicative of the character which has been sensed by the probe 20.

The lines designated A and B of FIG. 1 indicate the extremes of probe 20 movement which will permit a valid reading of the indicia bands.

Turning now to FIG. 4, there is shown the coding technique of FIG. 1 as applied to a punched record **10*a* together with a device for reading the information contained in such a punched record. In such an arrangement the presence or absence of punch apertures will serve to define the indicia state while the size of the punch apertures or unpunched areas will serve to define the indicia dimensions required. A first punch bar (not shown) of a first dimension may be employed to create wide punch apertures of great opacity, corresponding to the wide bands of high reflectivity in the article coding technique described with reference to FIG. 1. A second punch bar (not shown) of a smaller dimension may be employed to create narrow punch apertures of great opacity, corresponding to the narrow bands of high reflectivity. The unpunched areas, which may be wide or narrow will produce the bands of low opacity corresponding to the low reflectivity bands of FIG. 1. The record 10***a* is read or sensed by passing it between a source of illumination, such as the lamp 56 and a photo-responsive member such as photocell device 60. The apertured shield 58 will serve to direct the light from lamp 56 to the desired area of the record 10*a* while preventing the illumination of unwanted areas. The photocell device 60 will be baffled to properly restrict the entry of light so as to maintain the prescribed relationship as to the indicia sensed.

The punch apertures 50*a* will provide a wide dimension high opacity path for light from lamp 56 to the photocell device 60 while the punch apertures 54*a* will provide a narrow dimension high opacity path. The wide unpunched area 52*a* and the narrow unpunched area 55*a* will provide the low opacity paths, wide and narrow, respectively. The outputs of the photocell device 60 will be handled as was described above.

The technique described with respect to FIG. 1, may also be extended to the use of a magnetic record which will be sensed by passing adjacent a magnetic transducer 70 as shown by FIG. 5. The record 10*b* will have recorded on it discrete areas of either a first or second polarity describing the indicia states, such areas being wide or narrow corresponding to the indicia dimensions. The wide areas 50*b* will have a magnetic recording of a first polarity and will correspond to the wide bands of high reflectivity such as band *e* of zone III of FIG. 1. Similarly, the narrow band 54*b* will have the same first magnetic recording polarity as the wide bands 50*b* but will be narrower. These narrow bands are considered the equivalent of the narrow bands of high reflectivity such as the band *b* of zone I. In similar fashion the bands 52*a* and 55*a* will have a second polarity of magnetic recording and will be considered equivalent to the low reflectivity bands *a* and *f* of FIG. 1.

In a similar fashion it is possible to employ the areas 50*a* and 54*a* with a magnetic recording polarity of a first type and the areas 52*a* and 55*a* having no magnetic recording thereon and thus to make it possible to distinguish the indicia state and the indicia dimension equivalent to the low and high reflectivity and the wide and narrow bands of FIG. 1.

Yet another method of implementing this invention is illustrated by FIG. 6. In FIG. 6 the bands 50*c* and 54*c* are formed of materials having high conductivity whereas the bands 52*c* and 55*c* of formed materials of low conductivity to provide the desired indicia states. The respective widths of the bands are maintained the same as with respect to FIG. 1. The record 10*c* is then passed under a first conductive bar 80 which is connected to ground. The second conductive bar 72 is connected to the first input of the AND gate 74 which receives ground at the second one of its inputs. If the band passing under the electrodes 80 and 72 is a band of conductive material, such as band 50*c* then a complete path is provided from ground through the electrode 80, the conductive band 50*c*, the second electrode 72 to the AND gate 74 impressing ground upon the first input thereof. The second input also receives ground thus completing the necessary inputs to the AND gate and causing the production of an output signal. Upon the record 10*c* moving further and the electrodes 80 and 72 contacting the band 52*a* of low conductivity of the path between the electrodes 80 and 72 is open and no signal is produced by the AND gate 74.

In a similar fashion a signal will be produced by the AND gate 74 when the electrodes 80 and 72 contact the conductive area 54. However, due to the short time in which this contact is made the output signal will be of a limited duration thereby indicating that it is an intermediary or clock level signal being read. Thus depending upon the length of time electrodes 80 and 72 are in contact with the conductive and nonconductive bands signals will be present or absent which are indicative of the information read in the same manner as that described above with reference to FIG. 1.

While there has been shown and described and pointed out the fundamental novel features of the invention as applied to the preferred embodiments, it will be understood that various omissions and substitutions and changes of the form and details of the device as illustrated and in their operation may be made by those skilled in the art without departing from the spirit of the invention.

The embodiments of the invention in which an exclusive property or privilege is claimed are defined as follows:

1. An information coding system comprising:

a. a plurality of indicia sequentially arranged along a record such that each of said indicia is in contact with the adjacent previous and adjacent following ones of said indicia, except for the first and last ones of said indicia;

b. each indicia possessing two characteristics with one of said two characteristics derived from a first characteristic group and with the other of said two characteristics derived from a second characteristic group;

c. each adjacent one of said indicia differing from said previous and following indicia by a change between said characteristics within said first characteristic group;

d. said indicia including information indicia possessing either of the two characteristics from said first characteristic group and a predetermined one of the characteristics from said second characteristic group, and other indicia possessing either of the two characteristics from said first characteristic group and another of the characteristics from said second characteristic group;

e. successive information indicia being disposed adjacent one another when their respective characteristics from said first characteristic group differ and being separated by one of said other indicia only when their respective characteristics from said first characteristic group are the same.

2. A coding system as defined in claim 1, wherein said first characteristic group comprises at least two indicia states and said second characteristic group comprises at least two indicia dimensions and the combination of one of said indicia states and one of said indicia dimensions describes said information.

3. A coding system as defined in claim 2, wherein a. the first of said indicia states of said first characteristic group possesses a first reflectivity and the second of said indicia states of said first characteristic group possesses a second reflectivity;

b. the first of said indicia dimensions of said second characteristic group is of a first predetermined size and the second of said indicia dimensions of said second characteristic group is of a second predetermined size.

4. A coding system as defined in claim 2, wherein
a. the first of said indicia states of said first characteristic group possesses a first opacity and the second of said indicia states of said first characteristic group possesses a second opacity;
b. the first of said indicia dimensions of said second characteristic group is of a first predetermined size and the second of said indicia dimensions of said second characteristic group is of a second predetermined size.

5. The system of claim 1 including:
a. a reading device adapted for relative motion with respect to the record; and
b. sensing means mounted upon said device and adapted to sense said indicia in sequence and responsive thereto to produce discrete signals comprising:
i. a first signal being produced when said sensed indicia possesses a first characteristic from the first of said two groups and a first characteristic from the second of said two groups;
ii. a second signal being produced when said sensed indicia possesses a second characteristic from said first of said two groups and said first characteristic from the second of said two groups; and
iii. a third signal being produced when said sensed indicia possesses either a first or second characteristic from said first of said two groups and a second characteristic of said second of said two groups.

6. The system of claim 1 including:
a. a sensing probe;
b. a light source mounted within said probe for illuminating each of said discrete indicia in sequence; and
c. a light responsive member mounted within said probe and adapted to sense said indicia in sequence and responsive to the light reflected from said indicia; said light responsive member producing discrete signals in accordance with the indicia sensed;
i. a first signal being produced when said sensed indicia possesses a first characteristic from a first of said two groups and a first characteristic from the second of said two groups;
ii. a second signal being produced when said sensed indicia possesses a second characteristic from said first of said two groups and said first characteristic from said second of said two groups; and
iii. a third signal being produced when said sensed indicia possesses either a first or second characteristic from said first of said two groups and a second characteristic from said second of said two groups.

7. The encoding method of claim 6 wherein:
a. said indicia are formed by placing light reflective bars upon a record carrier;
b. said first characteristic from said first characteristic group constitutes a first degree of reflectivity;
c. said second characteristic from said first characteristic group constitutes a second degree of reflectivity;
d. said first characteristic from said second characteristic group constitutes a first predetermined dimension in the direction along which the sequence of indicia are disposed.
e. said second characteristic from said second characteristic group constitutes a second predetermined dimension in said direction.

8. A method of encoding information comprising:
a. providing a plurality of indicia in sequential arrangement such that each of said indicia is in contact with the adjacent previous and adjacent following ones of said indicia, except for the first and last ones of said indicia;
b. forming each indicia so as to possess two characteristics with one of said two characteristics derived from a first characteristic group and with the other of said two characteristics derived from a second characteristic group;
c. arranging adjacent ones of said indicia so as to differ from the previous and following indicia by a change between said characteristics within said first characteristic group;
d. including within said indicia information indicia possessing either of the two characteristics from said first characteristic group and a predetermined one of the characteristics from said second characteristic group, and other indicia possessing either of the two characteristics from said first characteristic group and another of the characteristics from said second characteristic group;
e. disposing successive information indicia adjacent one another when their respective characteristics from said first characteristic group differ; and
f. separating said information indicia by one of said other indicia only when the characteristics of said information indicia from said first characteristic group are the same.

9. The method of representing encoded information wherein the information is made up of a plurality of binary 1s and binary 0s comprising:
a. representing the binary 1s by a first indicia having a first state and a first predetermined dimension as measured in a predetermined direction and representing the binary 0s by a second indicia having a second state and said first predetermined dimension so that said first indicia and said second indicia may be disposed immediately adjacent one another and yet remain readily distinguishable by my sensing means capable of sensing said first state and said second state;
b. providing third indicia hving said first state and a second predetermined dimension, as measured in said predetermined direction, to render succeeding second indicia distinguishable to the sensing means;
c. providing fourth indicia having said second state and said second predetermined dimension to render succeeding first indicia distinguishable to the sensing means;
d. said second size of said third and fourth indicia being to prevent the sensing means from interpretating said third and fourth indicia as binary 1s or 0s.

10. The method of claim 9 wherein said first state constitutes a first degree of reflectivity and said second state constitutes a second degree of reflectivity.

11. The method of claim 10 wherein said first degree of reflectivity is obtained by providing a black bar and said second degree of reflectivity is obtained by providing a white bar.

12. The method of claim 9 wherein said second predetermined dimension is approximately one half that of said first predetermined dimension.

13. The method of claim 9 wherein said first state constitutes a first degree of opacity and said second state constitutes a second degree of opacity.

14. An information coding system including a plurality of indicia adapted to be disposed for coaction with an indicia sensor capable of providing outputs at at least a first level and a second level comprising:

a. a plurality of information indicia adapted to be disposed in sequence in a predetermined direction;

b. said information indicia including first information indicia which, while being sensed, will effect an output from the sensor at the first level, and second information indicia which, while being sensed, will effect an output from the sensor at the second level;

c. said first information indicia and said second information indicia being thus readily distinguishable by effecting outputs from the sensor at said first and second levels therefore being disposable immediately adjacent one another in the sequence;

c. other indicia including first other indicia for separating succeeding first inforation indicia and which when sensed concurrently with the information indicia it separates will effect movement of the sensor away from the first level, and second other indicia for separating succeeding second information indicia and which when sensed concurrently with the information indicia it separates will effect movement of the sensor away from the second level.

* * * * *